Feb. 20, 1968  B. KABRIEL  3,370,199
AUTOMOBILE STOP LIGHT OPERATION INDICATOR
Filed Oct. 18, 1965  2 Sheets-Sheet 1
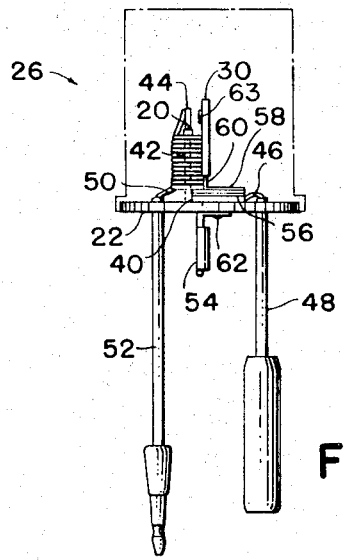
FIG.1
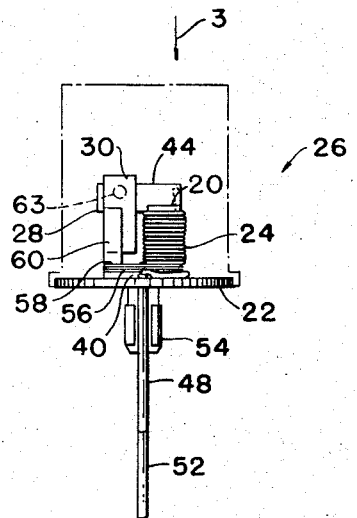
FIG.2
FIG.3
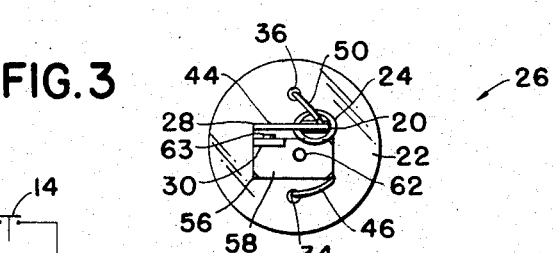
FIG.4
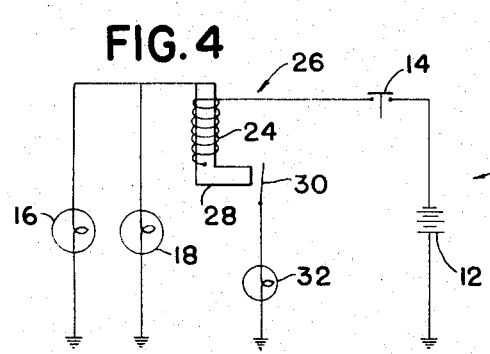
FIG.6
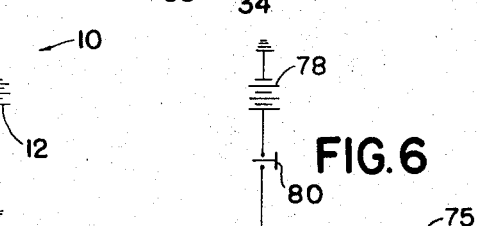
FIG.5
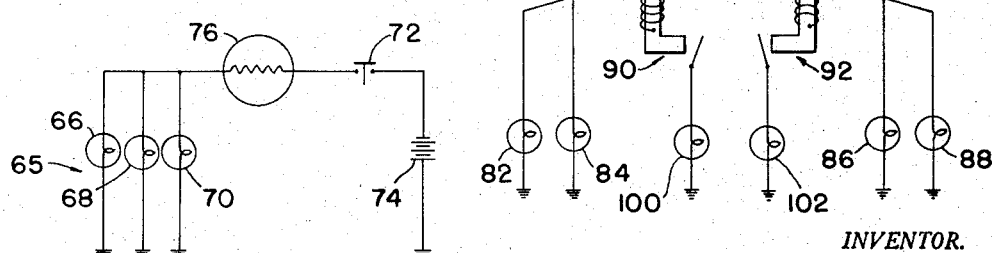
INVENTOR.
BOHUSLAV KABRIEL
BY Whittemore,
Hulbert & Belknap
ATTORNEYS Feb. 20, 1968     B. KABRIEL     3,370,199

AUTOMOBILE STOP LIGHT OPERATION INDICATOR

Filed Oct. 18, 1965     2 Sheets-Sheet 2

INVENTOR.
BOHUSLAV KABRIEL
BY Whittemore,
Hulbert & Belknap
ATTORNEYS

United States Patent Office 3,370,199
Patented Feb. 20, 1968

3,370,199
AUTOMOBILE STOP LIGHT OPERATION
INDICATOR
Bohuslav Kabriel, 324 Buckingham Drive,
Riverside, Ontario, Canada
Filed Oct. 18, 1965, Ser. No. 496,919
4 Claims. (Cl. 315—130)

ABSTRACT OF THE DISCLOSURE

A circuit for indicating operation of vehicle stop lights including a source of electrical energy, a stop light switch and one or more vehicle lights in parallel with each other connected in series and additional means in the series circuit for indicating operation of the vehicle lights on closing of the stop light switch. The additional means in the series circuit may be a resistance light of the type operable to provide a qualitative indication of the number of vehicle lights operating. Alternatively the additional means may be a relay coil and an indicator light operable to be connected in the series circuit on energizing of the coil by means of a movable armature actuated by the coil. Two separate embodiments of switch structure for connecting the indicator light into the circuit on failure of a vehicle stop light are included.

---

The invention relates to safety devices and refers more specifically to structure for providing a remote indication of malfunction of lights such as the stop lights of an automobile or the like.

Much emphasis is being placed on safety in automobiles today. The danger in driving an automobile or the like with defective lights is obvious. With the small cost of lights and the ease of replacement of lights there should be no drivers driving with defective lights.

Despite the emphasis on safety and the low cost and ease of replacing defective lights, many automobiles are operated daily with one or more defective lights. The difficulty apparently is in knowing when a light on an automobile is out. Thus it is difficult even to recognize when one of the headlights is not on due to the difference in lighting on different streets, the difference in lighting with different automobiles and the difference in lighting due to dirt and the like on lenses associated with the lights.

With stop lights the difficulty in determining whether or not the stop light is operating correctly is even greater since the stop lights cannot easily be seen by a person in position to actuate the usual stop light switch. Checking of vehicle stop lights under present conditions with the usual equipment requires assistance of a second person each time an automobile is to be operated to be sure that it is not operated with a defective stop light.

It is therefore a purpose of the present invention to provide structure for remote indication of operation of vehicle lights.

Another object is to provide in a vehicle a light circuit including a light switch and means for remote indication of operation of the vehicle lights and light switch.

Another object is to provide structure as set forth above wherein the means for indicating operation of the lights and light switch comprises an indicator light and means for lighting the indicator light during actuation of the switch only if the switch and light circuit are operating properly.

Another object is to provide structure as set forth above wherein the means for indicating operation of the lights and light switch comprises an indicator light and means for lighting the indicator light during actuation of the switch only if the switch and light circuit are not operating properly.

Another object is to provide structure as set forth above wherein the indicator light flashes on only momentarily on actuation of the switch if the light circuit and switch are operating properly.

Another object is to provide in an automobile or similar vehicle a stop light circuit including a stop light switch and means for remote indication of separation of the vehicle stop lights and stop light switch.

Another object is to provide structure for providing a quantitative indication of operation of vehicle stop lights or the like.

Another object is to provide structure for providing a qualitative indication of operation of vehicle stop lights or the like.

Another object is to provide a switch for use in remotely indicating operation of a vehicle's stop lights or the like.

Another object is to provide structure for the use in remote indication of operation of vehicle lights which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is an elevation view of switch structure constructed in accordance with the invention with the cover thereof illustrated in phantom.

FIGURE 2 is a view of the switch structure illustrated in FIGURE 1 taken substantially in the direction of arrow 2 in FIGURE 1.

FIGURE 3 is a top view of the switch structure illustrated in FIGURES 1 and 2 taken in the direction of arrow 3 in FIGURE 2.

FIGURE 4 is a schematic diagram of a basic automobile stop light circuit illustrating stop light operation indicating apparatus connected therein including switch structure as set forth in FIGURES 1–3.

FIGURE 5 is a schematic diagram of modified stop light operation indicating structure.

FIGURE 6 is a schematic diagram of still another modified stop light operation indicating structure.

Figure 7:
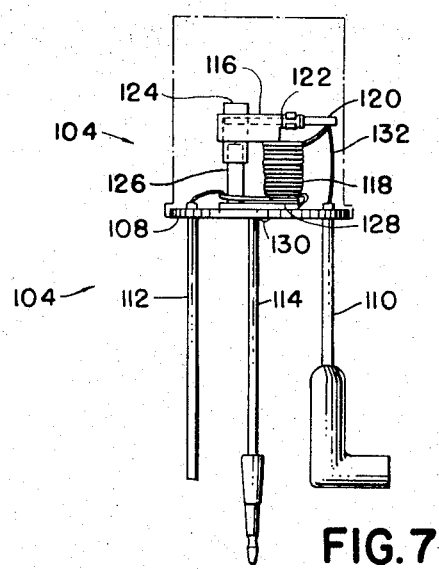
FIGURE 7 is an elevation view of modified switch structure constructed in accordance with the invention with the cover illustrated in phantom.
Figure 8:
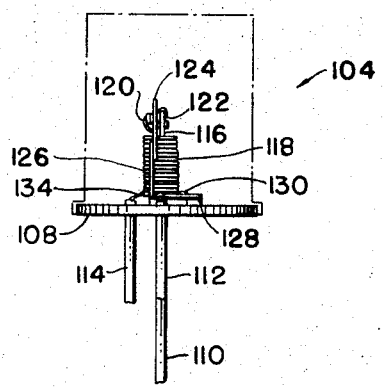
FIGURE 8 is a view of the modified switch structure illustrated in FIGURE 7 taken substantially in the direction of arrow 8 in FIGURE 7.
Figure 9:
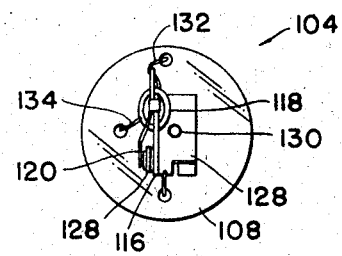
FIGURE 9 is a top view of the modified switch structure illustrated in FIGURES 7 and 8 taken in the direction of arrow 9 in FIGURE 8.

With particular reference to the figures of the drawing, one embodiment of the present invention will now be considered in detail.

The automobile stop light circuit 10 illustrated in FIGURE 4 includes a battery 12 and the normal brake operated stop light switch 14 in series with each other and in series with the parallel connected stop lights 16 and 18. The coil 24 of the switch structure 26 is placed in series in the stop light circuit 10 between the stop light switch 14 and the parallel stop lights 16 and 18, as shown. Coil 24 is wrapped around coil core 28 to form an electromagnet. The switch structure 26 further includes the resiliently mounted switch armature 30 connected in series with the indicator light 32, as shown in FIGURE 4. The indicator light 32 is adapted to be connected to the battery 12 on energization of the coil 24 to move the switch armature 30 into engagement with the coil core 28 only when both of the stop lights are operating to reduce the overall resistance in the circuit 10 to the point where the current through coil 24 produces an electromagnet strong enough to overcome the resilience of the mounting of switch armature 30.

The particular switch structure 26 is illustrated in more detail in FIGURES 1–3. As shown in FIGURES 1–3 the switch structure 26 includes a circular disc 22 of insulating material having a pair of opposed openings 34 and 36 extending therethrough. The coil core 28 having a base 40, an upwardly extending portion 42 and a top portion 44 extending parallel to the insulating disc is positioned on the disc centrally thereof. The coil 24 is wrapped around the upwardly extending portion 42 of the core 28 over insulating material 20 which insulates the coil from the core.

The base 40 of the core 28 is secured by convenient means such as solder to the wire 46 of the harness 48 extending through the opening 34 in the insulating disc 32. The upper end of the coil 24, as shown in FIGURES 1 and 2, is connected to the top portion 44 of the core 28 while the bottom of the coil 26 is connected to the wire 50 of the harness 52. The harness 48 and harness 52 are connected in the circuit 10 in series between the stop light switch 14 and the parallel connected stop lights 16 and 18 as shown in FIGURE 4.

An electrical connector 54 is positioned beneath the insulating disc 22, an insulating member 56 is positioned on the base 40 of the core 28 on top of which an electrically conducting resilient member 58 having the upstanding resilient spring like portion 60 is positioned. The electrical connector 54, coil core 28, insulating member 56 and resilient member 58 are all secured rigidly to the insulating disc 22 by means of the rivet 62 which is insulated from the coil core 28 but makes electrical contact between the resilient member 58 and the electrical connector 54.

The switch armature 30 having a contact member 63 thereon adjacent the top 44 of the core 28 is secured to the upstanding portion 60 of the resilient member 58. Thus on the coil 24 being energized the switch armature 30 is moved in opposition to the bias of the resilient member 58 into engagement with the upper part 44 of the core 28 to provide an electrical connection from the wire 46 through the core 28, contact member 63, armature 30, resilient member 58 and rivet 62. The indicator lamp 32 is connected to the electrical connector 54.

In overall operation of the stop light circuit 10 illustrated in FIGURE 4, when the stop light switch 14 is closed electric current from the usual vehicle battery 12 will energize the coil 24 to close the armature 30 in opposition to the bias provided by the upright portion 60 of the resilient member 56 only if sufficient current is provided through coil 24. Sufficient current is provided through the coil 24 only when both of the stop lights 16 and 18 are operating correctly. If one of the lights 16 or 18 are burnt out the resistance in circuit 10 will be raised to a level such that current through coil 24 is insufficient to close armature 30.

The upright portion 60 of the resilient member 58 must be sized and the positioning of the switch armature 30 from the top portion 44 of the core 28 must be such that the difference in current through the coil 26 with one of the stop lights 16, 18 not functioning will prevent movement of the armature 30 into engagement with the core 28. Initially the spacing required and the strength of the portion 60 of the resilient member 58 may be found by trial and error or by simple mathematical calculations within the scope of the art.

Providing a qualitative analysis of the number of lights in the stop light circuit which are not functioning is desired, the modified stop light circuit 65 illustrated in FIGURE 5 may be provided. In the modified circuit illustrated in FIGURE 5 the stop lights 66, 68 and 70 is parallel with each other are connected in series with a stop light switch 72 and the usual source of electrical energy 74 through a resistance light 76 having the property of shining brighter with more current passing therethrough.

With the circuit 65, when the stop light switch 72 is closed with all of the stop lights 66, 68 and 70 operating, the light 76 will burn brightly to indicate actuation of the switch 72 and operation of all of the lights. With one of the lights burnt out the light 76 will not burn so brightly, with two of the lights out the light 76 will be even less bright, and with all three of the lights not burning the light 76 will not light. The difference in the brightness of the light 76 is of course due to the increase in resistance in the circuit as each light 66, 68 and 70 are taken out of the parallel light combination.

The modified stop light indicator circuit 75 illustrated in FIGURE 6 again includes the usual battery source of electric energy 78, the stop light switch 80 and two pairs of parallel connected parallel stop lights 82 and 84 and 86 and 88. In the circuit of FIGURE 6 a pair of switch structures 90 and 92 and indicator lights 100 and 102 are provided connected in the separate parallel stop light circuits as shown. Thus for example on vehicles where a plurality of stop lights or the like are provided in separate circuits, it is possible to tell which stop light circuit has a malfunction therein.

Another embodiment of the invention is illustrated in FIGURES 7–10. The embodiment of the invention illustrated in FIGURES 7–10 includes the switch structure 104 which is especially adapted to be connected in a vehicle headlight circuit 106.

Specifically the switch 104 includes the insulating disc 108 through which the harness 110 and harness 112 adapted to be connected in series in a light circuit extend. The wire 114 which is adapted to be connected to an indicator light circuit also extends through the insulating disc 108. Switch 104 further includes the coil core 116 having base, upwardly extending and parallel extending portions around which an electrical coil 118 which is electrically insulated therefrom is wound. The contact member 120 mounted on the core 116 and insulated therefrom by insulating material 122 and the switch armature 124 supported on the resilient spring like electrically conducting member 126 and insulated from the core 116 by the insulating member 128 completes the switch 104. The insulating disc 108, core 116, insulating member 128 and resilient member 126 are secured together centrally of the insulating member 128 by means of the rivet 130.

The harness 110 is connected through wire 132 to the contact member 120 and the top of the coil 118 which is also connected to the contact member 120. The bottom of the coil 118 is connected through wire 134 to the harness 112. Harness 110 and harness 112 are adapted to be connected in series with a light circuit, for example the headlight circuit 106 of a vehicle illustrated in FIGURE 10. The wire 114 is connected to the resilient electrically conducting member 126 at one end and is connected to an indicator light 136 at the other end.

Figure 10:
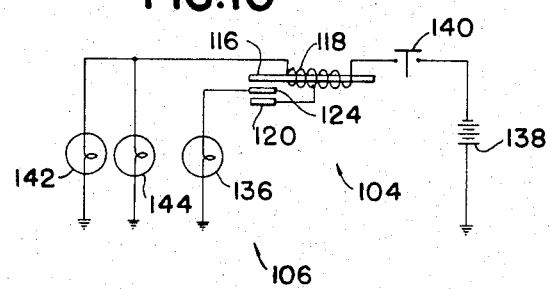
FIGURE 10 is a schematic diagram of a basic automobile headlight circuit illustrating headlight operation indicating apparatus connected therein including modified switch structure as set forth in FIGURES 7–9.

The headlight circuit 106 of a vehicle illustrated in FIGURE 10 includes the battery 138 and light switch 140 connected in series with the coil 118 of the indicator switch 104. The headlights 142 and 144 are connected in parallel with each other and in series with the battery, switch and coil as illustrated in FIGURE 10. The indicator light 136 is connected in parallel with the headlights 142 and 144.

In overall operation of the light circuit 106 illustrated in FIGURE 10 having the switch structure 104 therein, the switch 140 is closed at which time the headlights 142 and 144 are energized providing the switch 140 and lights are operable. Also, the indicator light 136 which is connected to the coil 118 electrically is energized momentarily. Build up of electrical current in the coil 118 makes the core 116 an electromagnet so that the switch armature 124 is moved into contact therewith away from the contact member 120. The indicator light 136 is thus immediately turned out after giving a brief flash to indicate operation of the headlights. Should either of the headlights fail to illuminate, the resistance in the circuit will be raised to the point where insufficient current will pass through coil 118 to maintain the armature 124 in contact with the core 116. The armature 124 under the bias of the resilient member 126 is at this time returned into contact with the contact member 120 and the indicator light 136 will come on to indicate malfunction in the light circuit 106.

While one embodiment of the present invention and modifications thereof have been considered in detail, it will be understood that other embodiments and modifications of the invention are contemplated. Thus the switch and circuits disclosed can be used to indicate the operation of other lights such as the taillights, headlights and parking lights of vehicles. It is the intention to include all modifications and embodiments as are defined by the appended claims within the scope of the invention.

What I claim as my invention is:

1. A circuit for indicating the operation of stop lights on an automobile or the like comprising a source of electrical energy, a stop light switch and one or more stop lights in parallel with each other all in order in a closed series circuit and switch structure including a pair of electric wires connected in series between the stop light switch and stop lights, a circular insulating disc through which the wires extend, a coil core having a base portion positioned on the disc, a portion extending upwardly therefrom and a portion extending parallel to the disc from the upper end of the upwardly extending portion, insulating means on the upwardly extending portion of the core, a coil wound around the core one end of one of said wires being connected to the base of the core, one end of said coil being connected to the upper end of the upwardly extending portion of the core and the other end of the coil being connected to the other wire extending through the disc, an insulating member positioned on the core base, a resilient support member positioned on the insulating member and a movable switch armature extending upright from the resilient member adjacent the parallel extending portion of the core, an electrical connector positioned on the underside of the insulating disc and means extending through the electrical connector, insulating disc, core base, insulating member and resilient member insulated from the core base and in electrical contact with the resilient means and electrical connector for securing the resilient member, insulating member, core base, and electrical connector to the disc and an indicator light connected to the electric connector in parallel with said stop lights.

2. Structure as set forth in claim 1 wherein the resilient means is of sufficient strength to resist closing of the switch armature on closing of the stop light switch when less than all of the stop lights are operating.

3. Switch structure for a stop light operation indicator circuit or the like comprising a circular disc of insulating material having a pair of oppositely disposed openings therethrough, a coil core positioned on said insulating disc and extending upwardly therefrom and parallel thereto, insulating material around the upright portion of the core, a coil wound on said core over the insulating material, a wire extending through one of the openings in the disc and secured to the core at the bottom thereof, means securing the top of the coil to the core at the top thereof, a second wire extending through the other opening through the disc connected to the bottom of the coil at the bottom of the core, a switch armature positioned adjacent said core, electrically conducting resilient means supporting said switch armature on said core, means insulating said resilient means from said core and means connecting said resilient means to an electric connector.

4. Switch structure comprising an insulating disc, a coil core having a base positioned on the insulating disc and having a portion extending upwardly from the base portion and a portion extending parallel to the insulating disc from the upper end of the upwardly extending portion, a contact member connected to and insulated from the parallel extending portion of the coil core and extending in parallel spaced relation thereto, an insulating member positioned on the base of the coil core, electrically conducting resilient means positioned on the insulating member and having a portion extending upwardly from the insulating disc, a switch armature connected to the upwardly extending portion of the resilient member and positioned between the coil core and contact member biased due to the resiliency of the resilient member into contact with the contact member, a coil wrapped around and insulated from the coil core connected at the upper end to the contact member operable in conjunction with the coil core to provide an electromagnet on sufficient current flowing therein to move the switch armature into contact with the coil core in opposition to the bias of the resilient member, a first harness extending through the insulating disc and including a wire connected to the contact member, a second harness extending through the insulating disc including a wire connected to the resilient electrically conducting member and a wire extending through the insulating disc and connected to the lower end of the coil.

References Cited

UNITED STATES PATENTS

| | | | |
|---|---|---|---|
| 2,514,604 | 7/1950 | Hollins | 315—77 X |
| 2,717,988 | 9/1955 | Myers | 315—82 X |
| 2,731,628 | 1/1956 | Campanella | 315—77 |
| 2,844,814 | 7/1958 | Partl | 340—251 |
| 2,941,186 | 6/1960 | Gelli | 340—251 X |
| 3,273,993 | 9/1966 | Hayden | 335—203 |

JAMES W. LAWRENCE, *Primary Examiner.*

R. JUDD, *Assistant Examiner.*